(12) United States Patent
Aizawa

(10) Patent No.: US 10,847,091 B2
(45) Date of Patent: Nov. 24, 2020

(54) DISPLAY DRIVER AND SEMICONDUCTOR DEVICE COMPRISING DISPLAY DRIVER

(71) Applicant: LAPIS Semiconductor Co., Ltd., Yokohama (JP)

(72) Inventor: Hiroki Aizawa, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 0 days.

(21) Appl. No.: 16/197,375

(22) Filed: Nov. 21, 2018

(65) Prior Publication Data
US 2019/0156756 A1 May 23, 2019

(30) Foreign Application Priority Data
Nov. 21, 2017 (JP) .................. 2017-223602

(51) Int. Cl.
*G09G 3/3258* (2016.01)
*G09G 3/36* (2006.01)
*G02F 1/133* (2006.01)
*G06F 1/04* (2006.01)

(52) U.S. Cl.
CPC ....... *G09G 3/3258* (2013.01); *G02F 1/13306* (2013.01); *G06F 1/04* (2013.01); *G09G 3/3688* (2013.01); *G09G 2310/0264* (2013.01); *G09G 2310/0289* (2013.01); *G09G 2310/0291* (2013.01); *G09G 2310/08* (2013.01); *G09G 2330/021* (2013.01)

(58) Field of Classification Search
CPC ............... G09G 3/3258; G09G 3/3688; G09G 2310/0264; G09G 2310/0289; G09G 2310/0291; G09G 2310/08; G09G 2330/021; G02F 1/13306; G06F 1/04
See application file for complete search history.

(56) References Cited

U.S. PATENT DOCUMENTS

| 2004/0036670 | A1* | 2/2004 | Chung | G09G 3/3688 345/99 |
| 2007/0195054 | A1* | 8/2007 | Kwon | G09G 3/3648 345/100 |
| 2015/0255035 | A1* | 9/2015 | Takahashi | G09G 3/3696 345/690 |

(Continued)

FOREIGN PATENT DOCUMENTS

JP  2012027127  2/2012

*Primary Examiner* — Stephen G Sherman
(74) *Attorney, Agent, or Firm* — JCIPRNET

(57) ABSTRACT

A display driver includes a data fetching unit that fetches first to Nth pixel data pieces corresponding to luminance levels of respective pixels and outputs the same at a timing of an edge of a clock signal, first to Nth amplifiers that amplify first to Nth gradation voltages corresponding to the first to Nth pixel data piece to obtain first to Nth driving voltages, and a bias voltage generation unit that generates and supplies bias voltages for setting current values of operation currents to the respective amplifiers. The bias voltage generation unit stores a first value and a second value of the bias voltage used for setting the current value to a higher value and a lower value, and generates a bias voltage having the first value during a period from the timing of the edge of the clock signal, and switches the voltage value to the second value thereafter.

9 Claims, 11 Drawing Sheets

(56) References Cited

U.S. PATENT DOCUMENTS

2016/0180764 A1* 6/2016 Noh ................... G09G 3/2018
                                                        345/690
2016/0308513 A1* 10/2016 Park .................. G09G 3/3688
2017/0032740 A1*  2/2017 Ko ................... H03F 3/45273
2017/0287383 A1* 10/2017 Hasegawa ............ G09G 3/2092

* cited by examiner

DISPLAY DRIVER AND SEMICONDUCTOR DEVICE COMPRISING DISPLAY DRIVER

CROSS-REFERENCE TO RELATED APPLICATION

This application claims the benefit of Japan Application No. 2017-223602, filed on Nov. 21, 2017. The entirety of the above-mentioned patent application is hereby incorporated by reference herein and made a part of this specification.

BACKGROUND

Technical Field

The disclosure relates to a display driver that drives a display device according to a video signal, and a semiconductor device including the display driver.

Related Art

A display driver that drives a liquid crystal display panel or an organic electroluminescence (EL) panel, for example, as a display device includes a plurality of output amplifiers that amplify a gradation voltage corresponding to a luminance level represented by a video signal and supply the amplified gradation voltage to source lines of the display device.

In addition, with the recent increase in a screen size and higher definition of display devices, for the output amplifiers, there is a demand for shortening a rising or falling time of an output voltage, that is, a so-called high slew rate. Incidentally, an output amplifier is configured of, for example, an operational amplifier and a high slew rate can be obtained by increasing a current flowing in a differential stage of the operational amplifier, but a problem that power consumption increases correspondingly arises.

Therefore, a technique in which dummy amplifiers having the same electrical characteristics as the output amplifiers are provided in the display driver, and a current flowing in the differential stage of the output amplifier is increased only during a transition period of an output level when the dummy amplifier is operated to thereby achieve a high slew rate has been proposed (see, for example, Japanese Patent Application Laid-Open No. 2012-27127 (Patent Document 1)).

However, when the above technique has been adopted, the dummy amplifier must be provided in the display driver, and therefore, a size of the driver increases correspondingly.

Further, since this dummy amplifier itself consumes the same power as the output amplifier, low power consumption is hindered. In addition, when an error occurs between a transition period of a voltage output from the dummy amplifier and a transition period of a voltage output from the output amplifier due to manufacturing variation, switching of the slew rate as described above may not be able to be performed at a correct time point. Accordingly, it is difficult to reliably reduce the amount of power consumption and drive the display device at high speed.

SUMMARY

A display driver according to the disclosure is a display driver that drives a display device including first to Nth (N is an integer equal to or more than 2) data lines, the display driver including: a data fetching unit that receives first to Nth pixel data pieces indicating luminance levels based on a video signal for each pixel and outputs the first to Nth pixel data pieces at a timing of an edge of a clock signal; a gradation voltage generation unit that converts the first to Nth pixel data pieces output from the data fetching unit into first to Nth gradation voltages; first to Nth amplifiers that supply first to Nth driving voltages obtained by amplifying the first to Nth gradation voltages to the first to Nth data lines; and a bias voltage generation unit that generates bias voltages for setting current values of operation currents of the first to Nth amplifiers and supplies the bias voltages to the first to Nth amplifiers, wherein the bias voltage generation unit includes a register that stores first information indicating a first voltage value that is a voltage value of the bias voltage for setting a current value of the operation current to a first current value and second information indicating a second voltage value that is a voltage value of the bias voltage for setting the current value of the operation current to a second current value lower than the first current value, and the bias voltage generation unit generates the bias voltage having the first voltage value indicated by the first information during a period from a time point of the edge of the clock signal to a time point at which a first period has elapsed, and switches the voltage value of the bias voltage to the second voltage value indicated by the second information at the time point at which the first period has elapsed.

A semiconductor device according to the disclosure is a semiconductor device including a display driver that drives a display device including first to Nth (N is an integer equal to or more than 2) data lines, the semiconductor device including: a data fetching unit that receives first to Nth pixel data pieces indicating luminance levels based on a video signal for each pixel and outputs the first to Nth pixel data pieces at a timing of an edge of a clock signal; a gradation voltage generation unit that converts the first to Nth pixel data pieces output from the data fetching unit into first to Nth gradation voltages; first to Nth amplifiers that supply first to Nth driving voltages obtained by amplifying the first to Nth gradation voltages to the first to Nth data lines; and a bias voltage generation unit that generates bias voltages for setting current values of operation currents of the first to Nth amplifiers and supplies the bias voltages to the first to Nth amplifiers, wherein the bias voltage generation unit includes a register that stores first information indicating a first voltage value that is a voltage value of the bias voltage for setting a current value of the operation current to a first current value and second information indicating a second voltage value that is a voltage value of the bias voltage for setting the current value of the operation current to a second current value lower than the first current value, and the bias voltage generation unit generates the bias voltage having the first voltage value indicated by the first information during a period from a time point of the edge of the clock signal to a time point at which a first period has elapsed, and switches the voltage value of the bias voltage to the second voltage value indicated by the second information at the time point at which the first period has elapsed.

DESCRIPTION OF THE EMBODIMENTS

According to an aspect of the disclosure, there is provided a display driver and a semiconductor device capable of driving a display device with low power consumption and at high speed while suppressing an increase in a scale of a device.

In the display driver according to the disclosure, the operation current of the amplifier that amplifies the gradation voltage supplied at the timing of the edge of the clock signal to generate the driving voltage is caused to be higher than that after a time point at which the first period has elapsed, during a period from a time point of the edge of the clock signal to the time point at which the first period has elapsed.

Accordingly, since a slew rate of the amplifier can increase during a rising or falling section of the driving voltage in which a high speed response is required, it is possible to achieve a short rising or falling time of the driving voltage. On the other hand, in a section in which the voltage value becomes constant after a time point at which the first period has elapsed, the operation current of the amplifier can be decreased, and therefore, it is possible to achieve low power consumption.

Therefore, it is possible to reliably drive the display device with low power consumption and at high speed in a small-scale configuration, as compared with a device which detects the transition period of the driving voltage by providing an amplifier that amplifies the gradation voltage and a dummy amplifier having the same characteristics as the amplifier and operating the dummy amplifier.

Hereinafter, embodiments of the disclosure will be described in detail with reference to the drawings.

Figure 1:
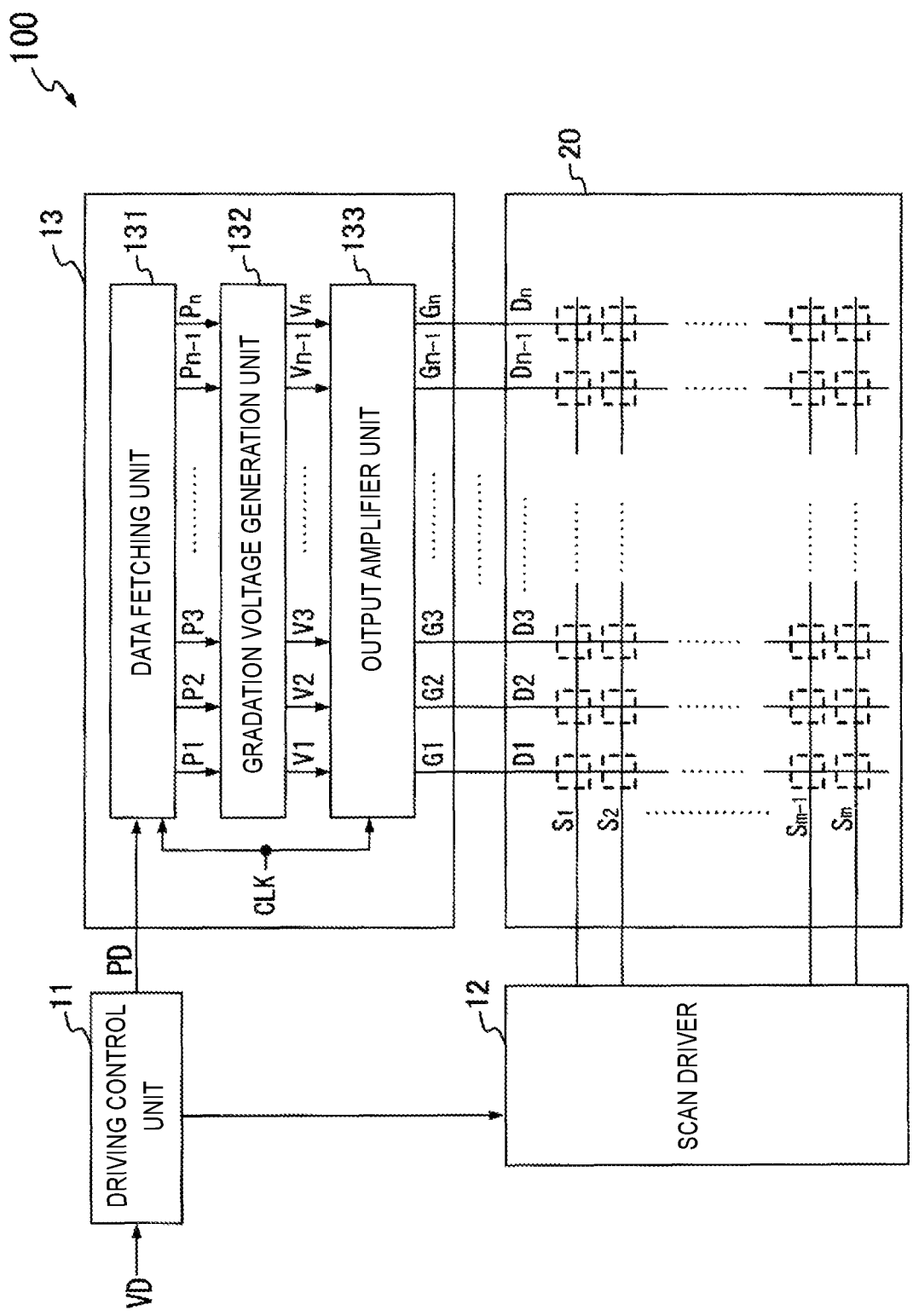
FIG. 1 is a block diagram illustrating a configuration of a display apparatus 100 including a display driver according to the disclosure.

FIG. 1 is a block diagram illustrating a configuration of a display apparatus 100 including a display driver according to the disclosure. As illustrated in FIG. 1, the display apparatus 100 includes a driving control unit 11, a scan driver 12, a data driver 13, and a display device 20.

The display device 20 is, for example, an organic EL panel or a liquid crystal display panel. In the display device 20, horizontal scan lines S1 to Sm (m is an integer equal to or greater than 2) extending in a horizontal direction of a two-dimensional screen and data lines D1 to Dn (n is an integer equal to or greater than 2) extending in a vertical direction of the two-dimensional screen are formed. A display cell is formed in a region of each intersection portion (a region surrounded by a broken line) of the horizontal scan line and the data line.

Further, the horizontal scan lines S1 to Sm are connected to the scan driver 12, and the data lines D1 to Dn are connected to the data driver 13.

Further, the driving control unit 11 detects a horizontal synchronization signal from a video signal VD and supplies the horizontal synchronization signal to the scan driver 12. In addition, the driving control unit 11 generates an image data signal PD including a sequence of pixel data pieces indicating a luminance level of the pixels using, for example, 8-bit luminance gradation based on the video signal VD, and supplies the image data signal PD to the data driver 13.

The scan driver 12 sequentially applies horizontal scan pulses to each of the horizontal scan lines S1 to Sm of the display device 20 at a timing synchronized with the horizontal synchronization signal supplied from the driving control unit 11.

The data driver 13 is formed as a semiconductor integrated circuit (IC) chip, and includes a data fetching unit 131, a gradation voltage generation unit 132, and an output amplifier unit 133.

The data fetching unit 131 fetches the pixel data pieces included in the image data signal PD for each horizontal scan line, that is, every n pixel data pieces. The data fetching unit 131 sets the fetched n pixel data pieces as pixel data P1 to Pn and supplies the pixel data P1 to Pn to the gradation voltage generation unit 132, for example, at a timing of a rising edge of the clock signal CLK.

The gradation voltage generation unit 132 converts the pixel data P1 to Pn supplied from the data fetching unit 131 into gradation voltages V1 to Vn having voltage values corresponding to the respective luminance levels and outputs the gradation voltages V1 to Vn to the output amplifier unit 133.

Figure 2:
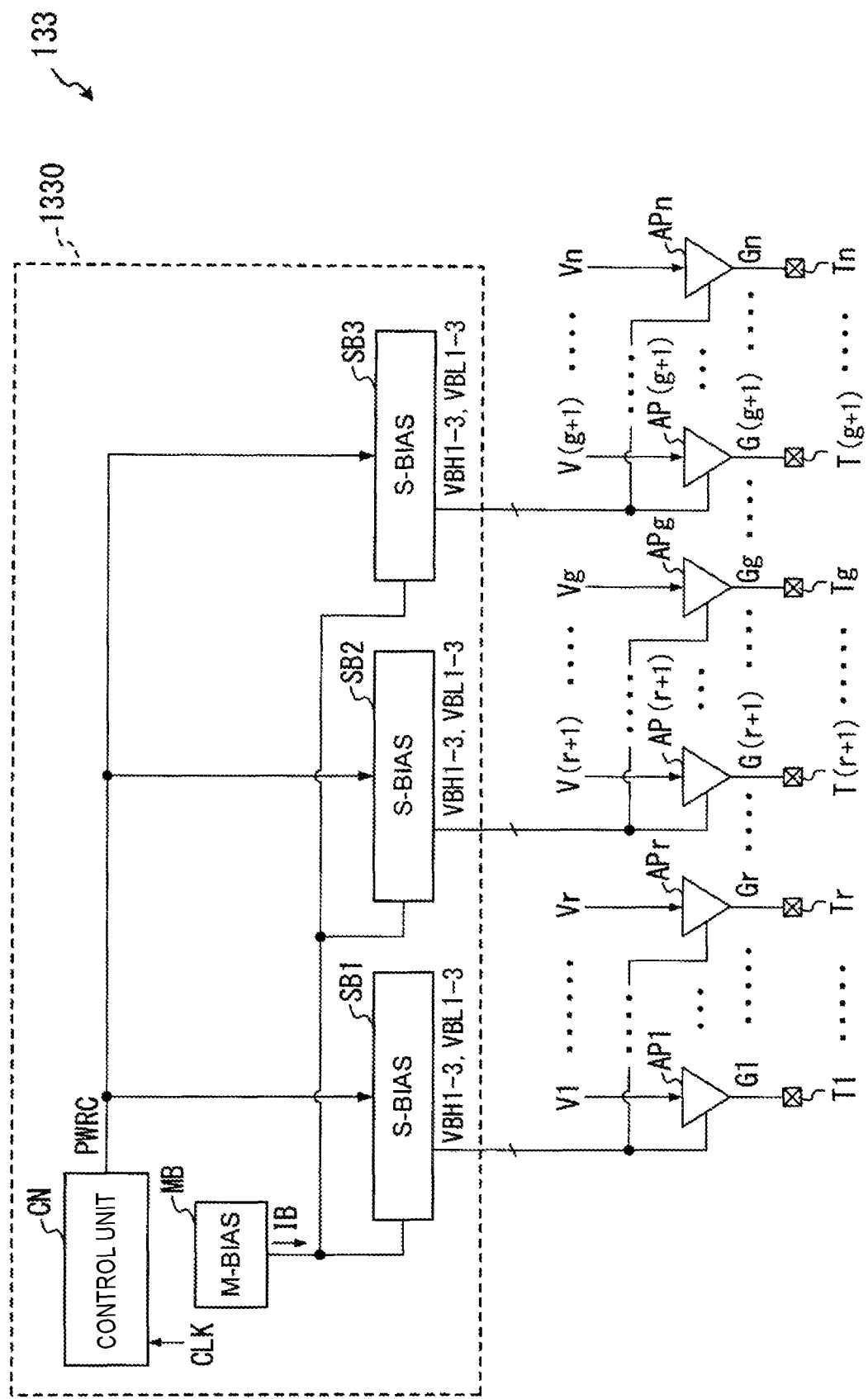
FIG. 2 is a block diagram illustrating an internal configuration of an output amplifier unit 133.

FIG. 2 is a block diagram illustrating an example of an internal configuration of the output amplifier unit 133. As illustrated in FIG. 2, the output amplifier unit 133 includes a bias voltage generation unit 1330 including a main bias circuit MB, sub-bias circuits SB1 to SB3, and a control unit CN, and amplifiers AP1 to APn.

The amplifiers AP1 to APn set n voltages obtained by amplifying the gradation voltages V1 to Vn as driving voltages G1 to Gn and output the driving voltages G1 to Gn via output terminals T1 to Tn of the semiconductor IC chip. The output terminals T1 to Tn are connected to the data lines D1 to Dn of the display device 20, respectively.

Further, each of the amplifiers AP1 to APn includes, for example, an operational amplifier. According to bias voltages VBH1 to VBH3 and VBL1 to VBL3 supplied from the sub-bias circuits SB1 to SB3, operation currents flowing in a differential stage and a current mirror stage of the operational amplifier are set. Accordingly, in each of the amplifiers AP1 to APn, an output slew rate thereof is adjusted according to the bias voltages VBH1 to VBH3 and VBL1 to VBL3.

The main bias circuit MB generates a reference current IB having a predetermined constant current and supplies the reference current IB to the respective sub-bias circuits SB1 to SB3.

Each of the sub-bias circuits SB1 to SB3 generates the bias voltages VBH1 to VBH3 and VBL1 to VBL3 having a voltage value corresponding to the bias voltage control signal PWRC based on the reference current IB.

The sub-bias circuit SB1 supplies the generated bias voltages VBH1 to VBH3 and VBL1 to VBL3 to, when the amplifiers AP1 to APn are divided into three groups, amplifiers AP1 to APr (r is an integer smaller than n) belonging to a first group. The sub-bias circuit SB2 supplies the bias voltages VBH1 to VBH3 and VBL1 to VBL3 to amplifiers AP(r+1) to APg (g is an integer greater than r and smaller than n) belonging to a second group among the amplifiers AP1 to APn. The sub-bias circuit SB3 supplies the bias voltages VBH1 to VBH3 and VBL1 to VBL3 subjected to the voltage value adjustment to amplifiers AP(g+1) to APn belonging to a third group among the amplifiers AP1 to APn.

The control unit CN generates the bias voltage control signal PWRC for setting the voltage values of the bias voltages VBH1 to VBH3 and VBL1 to VBL3 and supplies the bias voltage control signal PWRC to the sub-bias circuits SB1 to SB3.

Hereinafter, internal configurations of the control unit CN, the main bias circuit MB, and the sub-bias circuits SB1 to SB3 will be described in detail. Further, since the internal configuration of each of the sub-bias circuits SB1 to SB3 is the same, only the sub-bias circuit SB1 will be excerpted and described.

Figure 3:
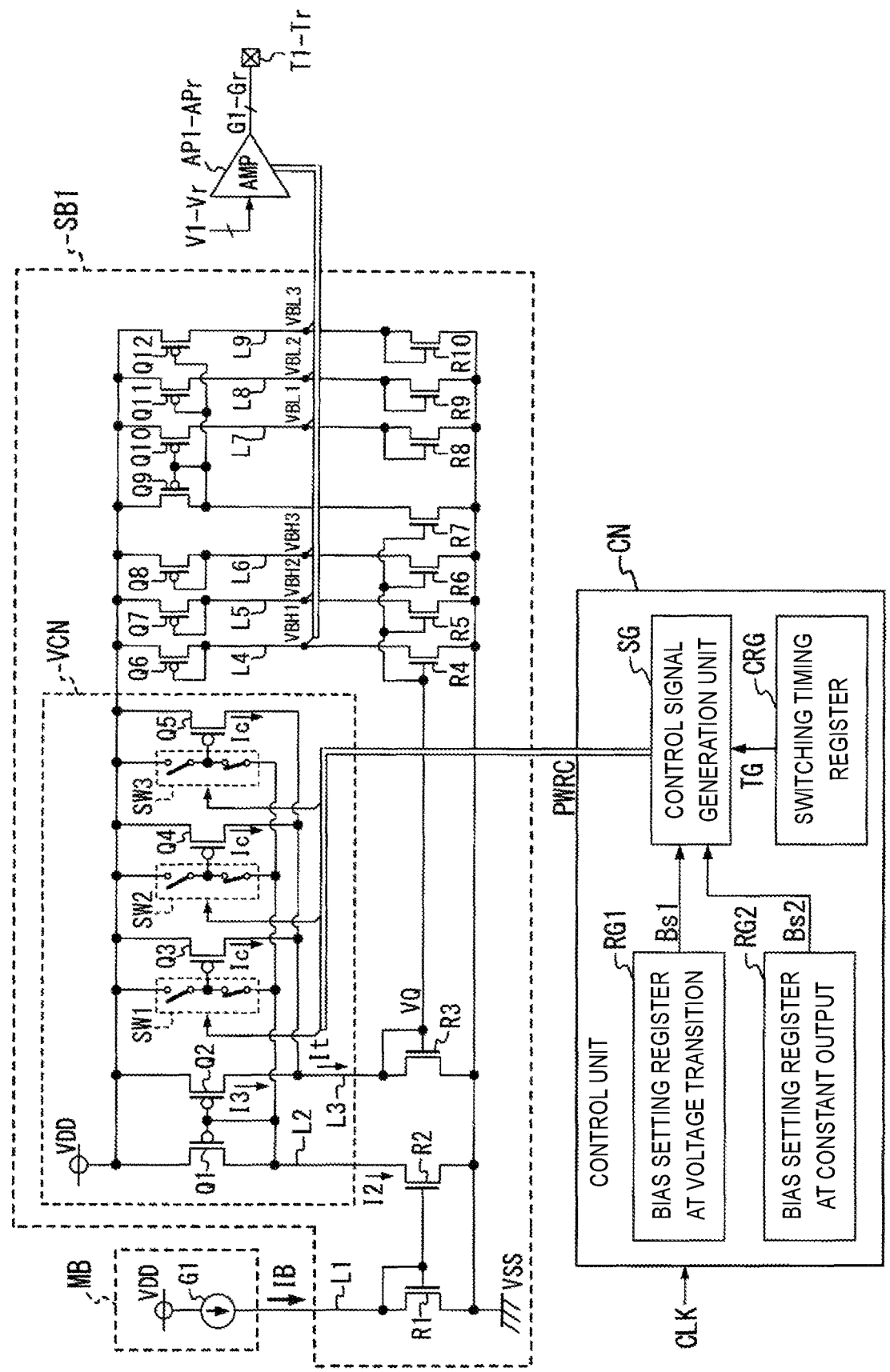
FIG. 3 is a diagram illustrating an example of internal configurations of a control unit CN, a main bias circuit MB, and a sub-bias circuit SB1 in detail.

FIG. 3 is a diagram illustrating an example of the internal configurations of the control unit CN, the main bias circuit MB, and the sub-bias circuit SB1.

The control unit CN includes a bias setting register at voltage transition RG1, a bias setting register at constant output RG2, a switching timing register CRG, and a control signal generation unit SG.

Bias voltage information Bs1 indicating the voltage values of the bias voltages VBH1 to VBH3 and VBL1 to VBL3 for setting the amplifiers AP1 to APr to a high slew rate during a rising or falling period of a driving voltage G is stored in the bias setting register at voltage transition RG1. The bias setting register at voltage transition RG1 supplies the bias voltage information Bs1 to the control signal generation unit SG.

Bias voltage information Bs2 indicating the voltage values of the bias voltages VBH1 to VBH3 and VBL1 to VBL3 for decreasing power consumption of the amplifiers AP1 to APr during a constant output period in which the amount of transition of the voltage value of the driving voltage G becomes smaller than a predetermined value is stored in the bias setting register at constant output RG2. The bias setting register at constant output RG2 supplies the bias voltage information Bs2 to the control signal generation unit SG.

Switching timing information TG indicating a timing at which the voltage values of the bias voltages VBH1 to VBH3 and VBL1 to VBL3 are switched is stored in the switching timing register CRG. The switching timing register CRG supplies the switching timing information TG to the control signal generation unit SG.

The control signal generation unit SG generates the bias voltage control signal PWRC based on the clock signal CLK, the switching timing information TG, and the bias voltage information Bs1 and Bs2.

That is, the control signal generation unit SG first fetches Bs1 among the bias voltage information Bs1 and Bs2 at a timing of a rising edge of the clock signal CLK. Then, the control signal generation unit SG generates the bias voltage control signal PWRC for causing the sub-bias circuit SB1 to generate the bias voltages (VBH1 to VBH3 and VBL1 to VBL3) having the voltage values indicated by the bias voltage information Bs1 and supplies the bias voltage control signal PWRC to the sub-bias circuit SB1. Here, the control signal generation unit SG fetches the bias voltage information Bs2 at a timing indicated by the switching timing information TG. The control signal generation unit SG generates the bias voltage control signal PWRC for causing the sub-bias circuit SB1 to generate the bias voltages (VBH1 to VBH3 and VBL1 to VBL3) having the voltage values indicated by the bias voltage information Bs2 and supplies the bias voltage control signal PWRC to the sub-bias circuit SB1.

Further, the bias voltage control signal PWRC includes, for example, information for designating the number of transistors to be set to an ON state among P-channel metal-oxide-semiconductor (MOS) type transistors Q3 to Q5 included in the sub-bias circuit SB1 as illustrated in FIG. 3.

The main bias circuit MB includes a current source G1 that receives a power supply potential VDD, generates the reference current IB, and supplies the reference current IB to the sub-bias circuit SB1 via a node L1.

The sub-bias circuit SB1 includes a voltage adjustment unit VCN including the P-channel MOS transistors Q1 to Q5 and switch circuits SW1 to SW3, P-channel MOS transistors Q6 to Q12, and N-channel MOS transistors R1 to R10.

The transistor R1 has a drain terminal and a gate terminal connected to the node L1 and a gate terminal of the transistor R2. A ground potential VSS is applied to a source terminal of each of the transistors R1 and R2. A drain terminal of the transistor R2 is connected to the voltage adjustment unit VCN via a node L2.

With this configuration, the transistor R2 causes a current I2 corresponding to the reference current IB to flow in the node L2.

Gate terminals of the transistors Q1 and Q2 of the voltage adjustment unit VCN are connected to the node L2. The power supply potential VDD is applied to respective source terminals of the transistors Q1 and Q2. The drain terminal of the transistor Q2 is connected to a drain terminal and a gate terminal of the transistor R3 via a node L3. A ground potential VSS is applied to a source terminal of the transistor R3.

With this configuration, the transistor Q2 generates a reference bias voltage VQ at the node L3 by sending a current I3 corresponding to the current I2 to the node L3.

The power supply potential VDD is applied to source terminals of the transistors Q3 to Q5 of the voltage adjustment unit VCN, and respective drain terminals thereof are connected to the node L3.

The switch circuit SW1 is set to a state in which the power supply potential VDD is supplied to the gate terminal of the transistor Q3 (referred to as an OFF state) or a state in which the node L2 is connected to the gate terminal of the transistor Q3 (referred to as an ON state) according to the bias voltage control signal PWRC. The switch circuit SW2 is set to a state in which the power supply potential VDD is supplied to the gate terminal of the transistor Q4 (referred to as an OFF state) or a state in which the node L2 is connected to the gate terminal of the transistor Q4 (referred to as an ON state) according to the bias voltage control signal PWRC. The switch circuit SW3 is set to a state in which the power supply potential VDD is supplied to the gate terminal of the transistor Q5 (referred to as an OFF state) or a state in which the node L2 is connected to the gate terminal of the transistor Q5 (referred to as an ON state) according to the bias voltage control signal PWRC.

The transistor Q3 is turned on only when the switch circuit SW1 enters the ON state and sends a current Ic corresponding to the current I2 to the node L3. The transistor Q4 is turned on only when the switch circuit SW2 enters the ON state and sends the current Ic corresponding to the current I2 to the node L3. The transistor Q5 is turned on only when the switch circuit SW3 enters the ON state and sends the current Ic corresponding to the current I2 to the node L3.

With the above configuration, the voltage adjustment unit VCN sends, to the node L3, a combination current It obtained by combining the current I3 corresponding to the reference current IB and the current Ic sent from the transistors Q3 to Q5 set to the ON state according to the bias voltage control signal PWRC. A voltage value of the reference bias voltage VQ generated by sending the combination current It to the node L3 is adjusted.

For example, when the voltage adjustment unit VCN receives the bias voltage control signal PWRC indicating zero as the number of transistors to be set to the ON state among the transistors Q3 to Q5, the combination current It flowing through the node L3 becomes the current I3.

Further, when the voltage adjustment unit VCN receives the bias voltage control signal PWRC indicating "2" as the number of transistors to be set to the ON state among the transistors Q3 to Q5, only Q3 and Q4 among the transistors Q3 to Q5, for example, are set to the ON state. Accordingly, the combination current It becomes a current (I3+2·Ic) obtained by adding the current Ic sent from each of the transistors Q3 and Q4 to the current I3.

That is, the voltage adjustment unit VCN illustrated in FIG. 3 generates the reference bias voltage VQ having the voltage value indicated by the bias voltage information Bs1 or Bs2 by adjusting the voltage value of the reference bias voltage VQ in the four stages according to the bias voltage control signal PWRC.

In FIG. 3, a gate terminal of each of the transistors R4 to R7 is connected to the gate terminal of the transistor R3 and the node L3, and the ground potential VSS is applied to a source terminal of each of the transistors R4 to R7. A drain terminal of the transistor R4 is connected to a gate terminal and a drain terminal of the transistor Q6 via a node L4. A drain terminal of the transistor R5 is connected to a gate terminal and a drain terminal of the transistor Q7 via a node L5. A drain terminal of the transistor R6 is connected to a gate terminal and a drain terminal of the transistor Q8 via a node L6. The power supply potential VDD is applied to source terminals of the transistors Q6 to Q8.

The drain terminal of the transistor R7 is connected to a drain terminal of the transistor Q9 and a gate terminal of each of the transistors Q9 to Q12. The power supply potential VDD is applied to source terminals of the transistors Q9 to Q12. A drain terminal of the transistor Q10 is connected to a gate terminal and a drain terminal of the transistor R8 via a node L7. A drain terminal of the transistor Q11 is connected to the gate terminal and a drain terminal of the transistor R9 through a node L8. A drain terminal of the transistor Q12 is connected to the gate terminal and a drain terminal of the transistor R10 through the node L9. The ground potential VSS is applied to a source terminal of each of the transistors R8 to R10.

In a circuit configured of the transistors R4 and Q6, the transistor R4 causes a current corresponding to the reference bias voltage VQ supplied to the gate terminal of the transistor R4 to flow to the node L4. Accordingly, a voltage generated at the node L4 is supplied to the amplifiers AP1 to APr as the bias voltage VBH1.

In a circuit configured of the transistors R5 and Q7, the transistor R5 causes a current corresponding to the reference bias voltage VQ supplied to the gate terminal of the transistor R5 to flow to the node L5. Accordingly, a voltage generated at the node L5 is supplied to the amplifiers AP1 to APr as the bias voltage VBH2.

In a circuit configured of the transistors R6 and Q8, the transistor R6 causes a current corresponding to the reference bias voltage VQ supplied to the gate terminal the transistor R6 to flow to the node L6. Accordingly, a voltage generated at the node L6 is supplied to the amplifiers AP1 to APr as the bias voltage VBH3.

Further, the transistor R7 causes a current corresponding to the reference bias voltage VQ supplied to the gate terminal the transistor R7 to flow through the transistor Q9. Accordingly, the current corresponding to the reference bias voltage VQ is sent from the drain terminals of the transistors Q10 to Q12 to the nodes L7 to L9.

In this case, a voltage generated at the node L7 by the transistor Q10 sending the current corresponding to the reference bias voltage VQ to the node L7 is supplied to the amplifiers AP1 to APr as the bias voltage VBL1. Further, a voltage generated at the node L8 by the transistor Q11 sending the current corresponding to the reference bias voltage VQ to the node L8 is supplied to the amplifiers AP1 to APr as the bias voltage VBL2. Further, a voltage generated at the node L9 by the transistor Q12 sending the current corresponding to the reference bias voltage VQ to the node L9 is supplied to the amplifiers AP1 to APr as the bias voltage VBL3.

Each of the amplifiers AP1 to APr has the same internal configuration. Therefore, hereinafter, AP1 among the amplifiers AP1 to APr will be excerpted and the internal configuration thereof will be described in detail.

Figure 4:
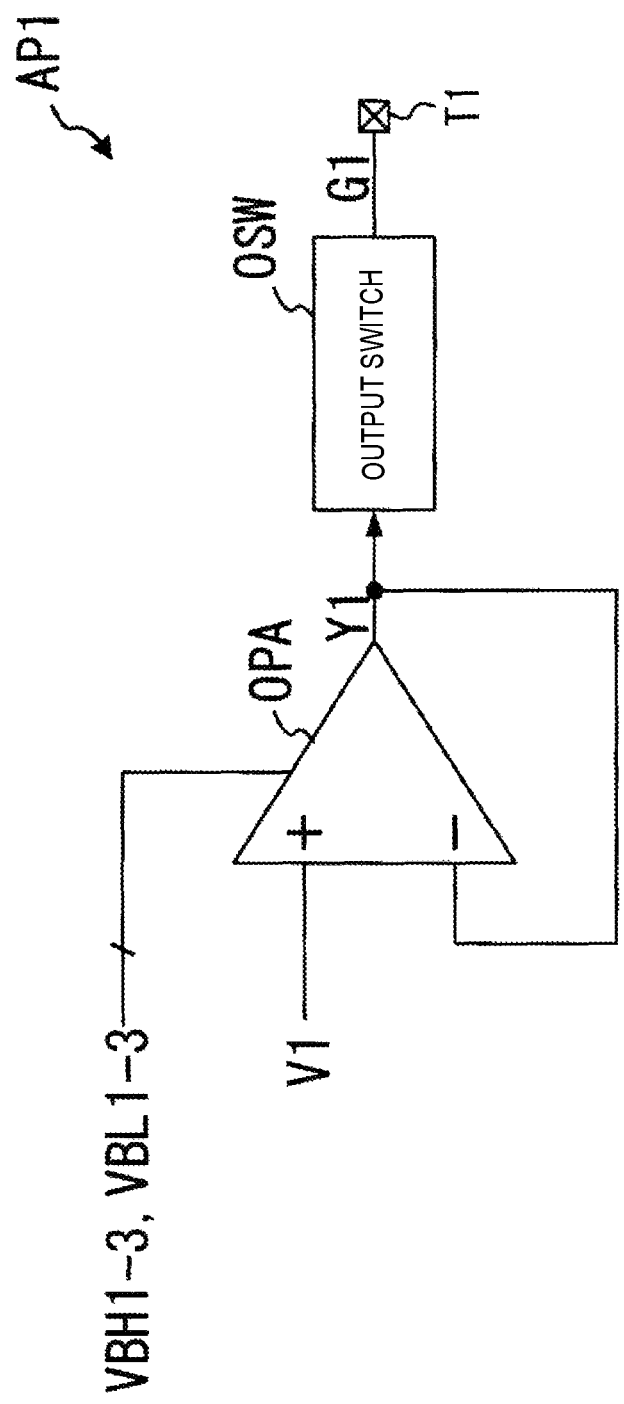
FIG. 4 is a circuit diagram illustrating an example of an internal configuration of an amplifier AP1.

FIG. 4 is a block diagram schematically illustrating the internal configuration of the amplifier AP1. As illustrated in FIG. 4, the amplifier AP1 includes an operational amplifier OPA and an output switch OSW.

The operational amplifier OPA is configured of a so-called voltage follower in which an output terminal is connected to an inverting input terminal. The operational amplifier OPA supplies, to the output switch OSW, an output voltage Y1 obtained by amplifying the gradation voltage V1 received by the inverting input terminal with a gain of 1. The operational amplifier OPA changes an output slew rate by adjusting an operation current of the operational amplifier OPA according to the bias voltages VBH1 to VBH3 and VBL1 to VBL3. The output switch OSW outputs the output voltage Y1 as the driving voltage G1 from the output terminal T1 of the semiconductor IC chip only in the ON state.

Figure 5:
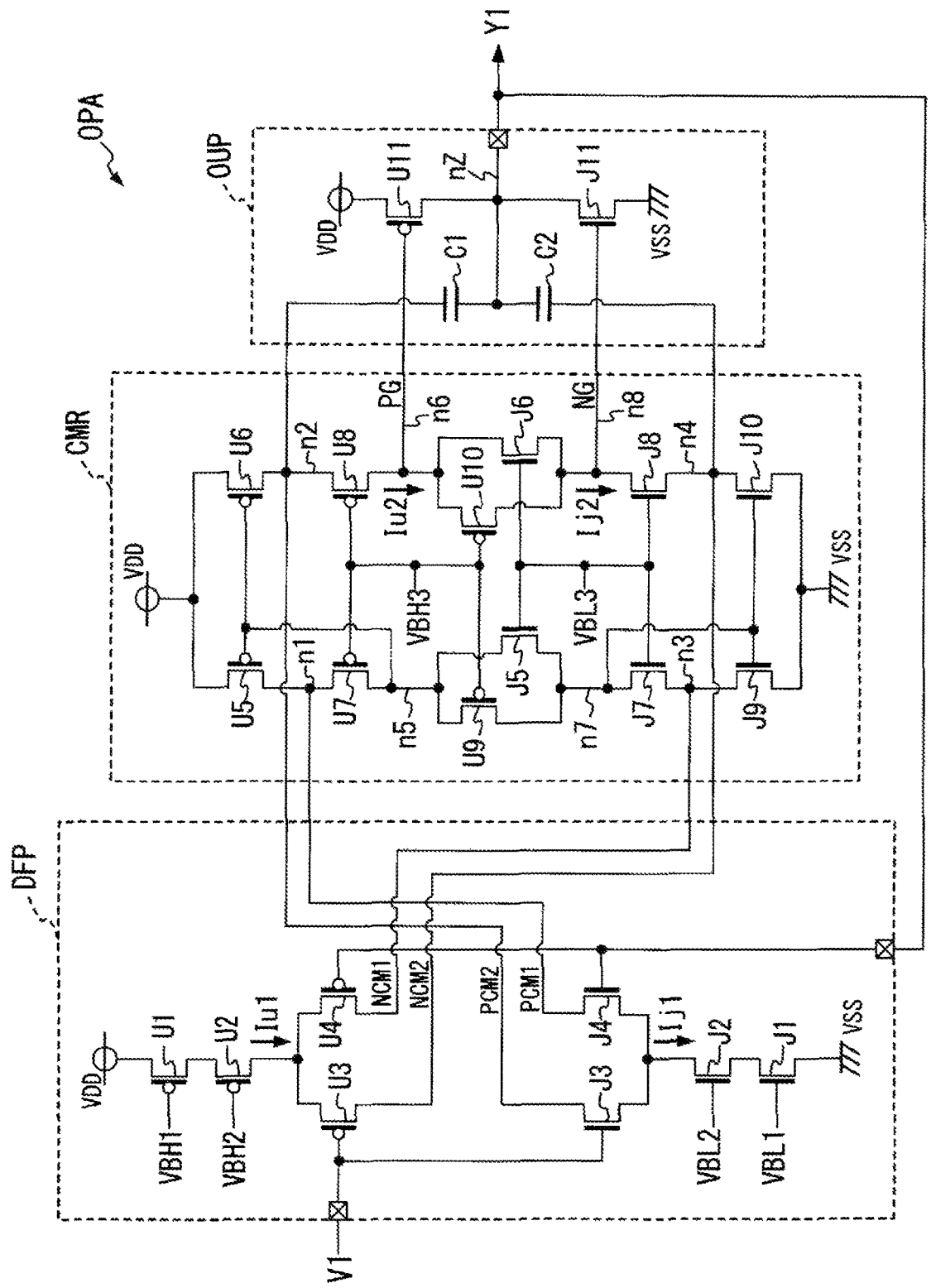
FIG. 5 is a circuit diagram illustrating an internal configuration of an operational amplifier OPA.

FIG. 5 is a circuit diagram illustrating an internal configuration of the operational amplifier OPA. The operational amplifier OPA includes a differential stage DFP, a current mirror stage CMR, and an output stage OUP.

The differential stage DFP includes P-channel MOS transistors U1 to U4 and N-channel MOS transistors J1 to J4.

The power supply potential VDD is applied to a source terminal of the transistor U1, and the bias voltage VBH1 is supplied to a gate terminal of the transistor U1. A drain terminal of the transistor U1 is connected to a source terminal of the transistor U2. The bias voltage VBH2 is supplied to a gate terminal of the transistor U2, and a drain terminal of the transistor U2 is connected to a source terminal of each of the transistors U3 and U4.

With such a configuration, the transistors U1 and U2 generate an operation current Iu1 having a current value corresponding to the bias voltages VBH1 and VBH2 based on the power supply potential VDD, and supply the operation current Iu1 to the transistors U3 and U4.

The transistors U3 and U4 generate, as currents NCM1 and NCM2, currents obtained by dividing the operation current Iu1 supplied from the transistor U2 by two at a voltage ratio of the gradation voltage V1 received by the respective gate terminals and the output voltage Y1 which is an output of the operational amplifier OPA. The transistors U3 and U4 supply the currents NCM1 and NCM2 to respective nodes n3 and n4 of the current mirror stage CMR via respective drain terminals.

That is, the transistor U3 supplies the current NCM2 corresponding to the voltage value of the gradation voltage V1 to the node n4 of the current mirror stage CMR. The transistor U4 supplies the current NCM1 corresponding to the voltage value of the output voltage Y1 to the node n3 of the current mirror stage CMR.

The ground potential VSS is applied to a source terminal of the transistor J1, and the bias voltage VBL1 is supplied to a gate terminal of the transistor J1. A drain terminal of the transistor J1 is connected to a source terminal of the transistor J2. The bias voltage VBL2 is supplied to a gate terminal of the transistor J2, and a drain terminal of the transistor J2 is connected to source terminals of the transistors J3 and J4.

With such a configuration, the transistors J1 and J2 generate an operation current Ij1 having a current value according to the bias voltages VBL1 and VBL2, and extract the operation current Ij1 from source terminals of the transistors J3 and J4.

The transistors J3 and J4 generate, as currents PCM1 and PCM2, currents obtained by dividing the operation current Ij1 in two at a voltage ratio of the gradation voltage V1 received by the respective gate terminals and the output voltage Y1. The transistors J3 and J4 extract the currents PCM1 and PCM2 from nodes n1 and n2 of the current mirror stage CMR via the respective drain terminals.

That is, the transistor J3 extracts the current PCM2 corresponding to the gradation voltage V1 from the node n2 of the current mirror stage CMR and supplies the current PCM2 to the drain terminal of the transistor J2. The transistor J4 extracts the current PCM1 corresponding to the output voltage Y1 from the node n1 of the current mirror stage CMR and supplies the current PCM1 to the drain terminal of the transistor J2.

Further, in the differential stage DFP, the current value of the operation current Iu1 is adjusted according to the bias voltages VBH1 and VBH2, and the current value of the operation current Ij1 is adjusted according to the bias voltages VBL1 and VBL2. Accordingly, for example, a higher current is supplied to the nodes n3 and n4 of the current mirror stage CMR as the voltage values of the bias voltages VBH1 and VBH2 decrease. Further, for example, a higher current is extracted from the nodes n1 and n2 of the current mirror stage CMR as the voltage values of the bias voltages VBL1 and VBL2 increase.

The current mirror stage CMR includes P-channel MOS transistors U5 to U10 and N-channel MOS transistors J5 to J10.

The power supply potential VDD is applied to source terminals of the transistors U5 and U6, and respective gate terminals of the transistors U5 and U6 are connected to each other. A drain terminal of the transistor U5 is connected to a source terminal of the transistor U7 via the node n1. A drain terminal of the transistor U6 is connected to a source terminal of the transistor U8 via the node n2.

The bias voltage VBH3 is applied to gate terminals of the transistors U7 and U8. A drain terminal of the transistor U7 is connected to the gate terminals of the transistors U5 and U6, a source terminal of the transistor U9, and a drain terminal of the transistor J5 via a node n5.

A drain terminal of the transistor U8 is connected to a source terminal of the transistor U10 and a drain terminal of the transistor J6 via a node n6 that is a driving node on the high potential side.

The bias voltage VBH3 is applied to a gate terminal of each of the transistors U9 and U10. A drain terminal of the transistor U9 and a source terminal of the transistor J5 are connected to a drain terminal of the transistor J7 via a node n7.

A drain terminal of the transistor U10 and a source terminal of the transistor J6 are connected to a drain terminal of the transistor J8 via a node n8 that is a driving node on a low potential side. The bias voltage VBL3 is applied to gate terminals of the transistors J5 and J6.

The bias voltage VBL3 is applied to the gate terminals of the transistors J7 and J8. A source terminal of the transistor J7 is connected to a drain terminal of the transistor J9 via the node n3. A source terminal of the transistor J8 is connected to a drain terminal of the transistor J10 via the node n4.

The ground potential VSS is applied to source terminals of the transistors J9 and J10, and gate terminals of the transistors J9 and J10 are connected to the drain terminal of the transistor J7.

With the above configuration, in the current mirror stage CMR, an operation current Iu2 having a current value corresponding to a difference between the current PCM1 and the current PCM2 supplied from the differential stage DFP flows in the node n6. Further, in the current mirror stage CMR, an operation current Ij2 having a current value corresponding to a difference between the current NCM1 and the current NCM2 supplied from the differential stage DFP flows in the node n8.

Accordingly, in the current mirror stage CMR, an output driving voltage PG on the high potential side is generated at the node n6 that is a driving node by supplying or extracting the operation current Iu2 corresponding to the difference between the current PCM1 and the current PCM2 to or from the node n6. The current mirror stage CMR supplies the output driving voltage PG to a gate terminal of a P-channel MOS transistor U11 of the output stage OUP.

Further, in the current mirror stage CMR, an output driving voltage NG on the low potential side is generated at the node n8 that is a driving node by supplying or extracting the operation current Ij2 corresponding to the difference between the current NCM1 and the current NCM2 to or from the node n8. The current mirror stage CMR supplies the output driving voltage NG to a gate terminal of an N-channel MOS transistor J11 of the output stage OUP.

The output stage OUP includes capacitors C1 and C2 for phase compensation, in addition to the transistors U11 and J11.

One terminal of the capacitor C1 is connected to the node n2 of the current mirror stage CMR, and the other terminal thereof is connected to an output node nZ. One terminal of the capacitor C2 is connected to the node n4 of the current mirror stage CMR and the other terminal thereof is connected to the output node nZ.

The power supply potential VDD is applied to a source terminal of the transistor U11, and the output driving voltage PG is supplied to the gate terminal of the transistor U11. The transistor U11 generates a current corresponding to the output driving voltage PG based on the power supply potential and supplies the current to the output node nZ, thereby increasing a potential of the output node nZ.

The ground potential VSS is applied to the source terminal of the transistor J11, and the output driving voltage NG is supplied to the gate terminal of the transistor J11. The transistor J11 extracts a current corresponding to the output driving voltage NG from the output node nZ, thereby decreasing the potential of the output node nZ.

By the operations of the transistors U11 and J11, the output voltage Y1 is generated at the output node nZ and output via the output terminal. In this case, the output voltage Y1 that has been output is fed back and supplied to the gate terminal of the transistor U4 on the high-potential side of the differential stage DFP and the gate terminal of the transistor J4 on the low potential side thereof.

Meanwhile, in the current mirror stage CMR, the current values of the operation currents Iu2 and Ij2 flowing through the nodes n6 and n8 that are the driving nodes are adjusted according to the bias voltages VBH3 and VBL3.

For example, the operation current Iu2 flowing in the node n6 that is a driving node increases as the voltage value of the bias voltage VBH3 decreases, and the operation current Ij2 flowing in the node n8 that is a driving node increases as the voltage value of the bias voltage VBL3 increases. Accordingly, a rising time and a falling time of the output driving voltages PG and NG become short, the slew rate of the operational amplifier OPA becomes high.

On the other hand, the operation current Iu2 flowing in the node n6 that is a driving node decreases as the voltage value of the bias voltage VBH3 increases, and the operation current Ij2 flowing in the node n8 that is a driving node decreases as the voltage value of the bias voltage VBL3 decreases. Accordingly, power consumption of the operational amplifier OPA is reduced.

In short, the operational amplifier OPA includes the differential stage, the current mirror stage, the output stage, and the bias adjustment unit that perform the following operations. That is, the differential stage (DFP) generates the first current (PCM1 and NCM1) and the second current (PCM 2 and NCM2) obtained by dividing the first operation current (Iu1 and Ij1) in two at the voltage ratio between the gradation voltage (V) to be input and the output voltage (Y) to be output. The current mirror stage (CMR) supplies or extracts the second operation current (Iu2 and Ij2) corresponding to the difference between the first current and the second current to or from the driving node (n6 and n8) to thereby generate the output driving voltage (PG and NG) at the driving node. The output stage (OUP) supplies or extracts an output current corresponding to the output driving voltage to or from the output node (nZ) to thereby generate the output voltage (Y) at the output node. The bias adjustment units (U1, U2, J1, J2, U8, U10, J6, and J8) adjust the current values of the first operation current (Iu1 and Ij1) and the second operation current (Iu2 and Ij2) according to the bias voltages (VBH1 to VBH3 and VBL1 to VBL3).

Next, an operation of the configuration illustrated in FIG. 3 will be described.

Figure 6:
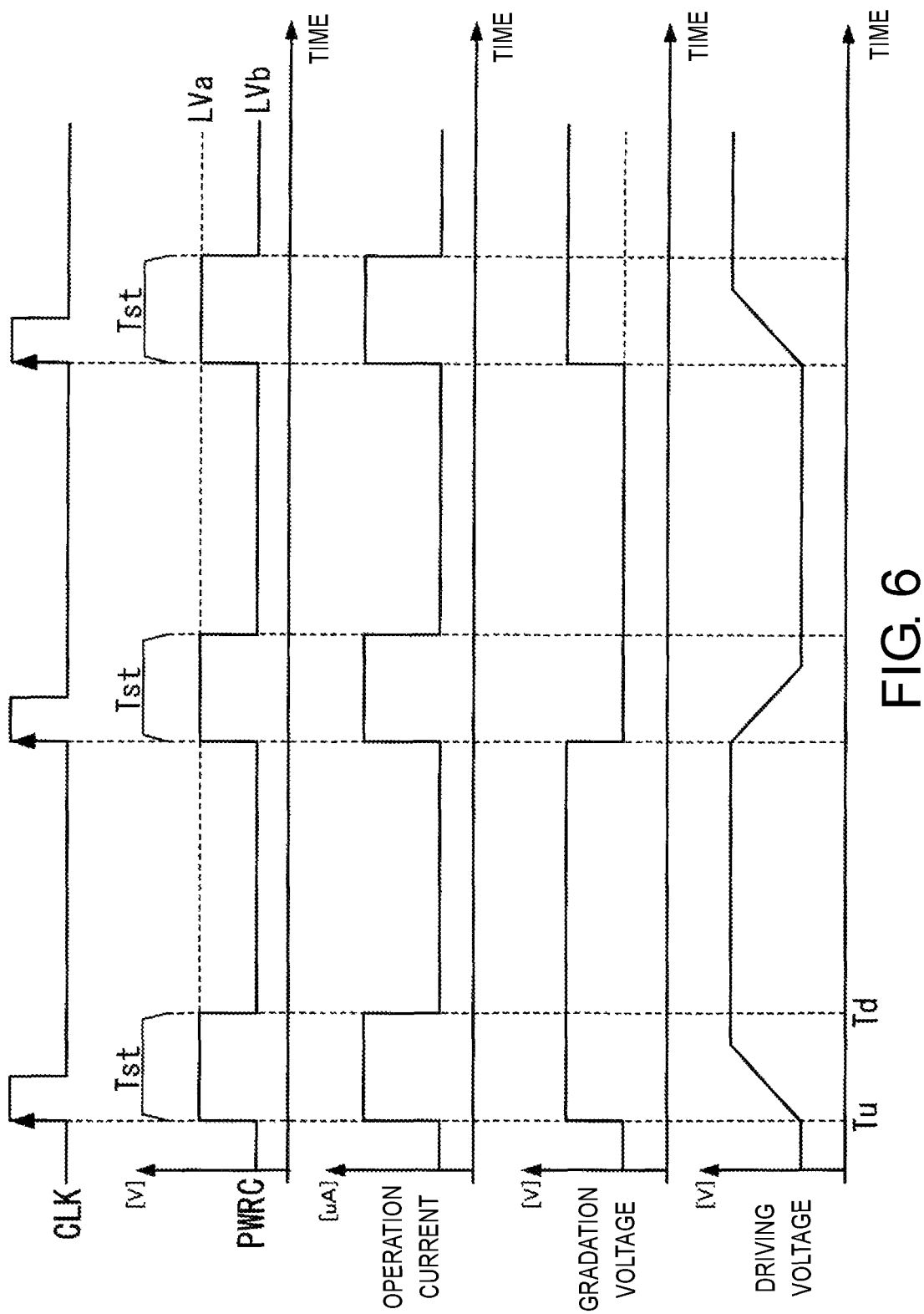
FIG. 6 is a time chart showing an example of a bias voltage control signal PWRC that is generated by a control signal generation unit SG, and a transition of an operation current flowing inside AP1 among amplifiers AP1 to APr.

FIG. 6 is a time chart showing an example of the bias voltage control signal PWRC generated by the control signal generation unit SG illustrated in FIG. 3, and transition of an operation current flowing inside the amplifier AP1 among the amplifiers AP1 to APr.

Here, it is assumed that the switching timing information TG, as illustrated in FIG. 6, indicating a time point at which a high slew rate period Tst (hereinafter also referred to as a high SR period Tst) has elapsed from a time point of the rising edge of the clock signal CLK as a switching timing is stored in the switching timing register CRG. Further, the high SR period Tst is a period obtained by adding a predetermined margin period to a time taken for transition of the driving voltage G from a voltage value indicating a lowest luminance to a voltage value indicating a highest luminance, for example, when the gradation voltage input to the amplifier AP has transitioned from a state indicating the lowest luminance to a state indicating the highest luminance.

In FIG. 6, the control signal generation unit SG first generates the following bias voltage control signal PWRC over the high SR period Tst indicated by the switching timing information TG from the time point Tu of the rising edge of the clock signal CLK, and supplies the bias voltage control signal PWRC to the sub-bias circuit SB1. That is, the control signal generation unit SG generates the bias voltage control signal PWRC for causing the sub-bias circuit SB1 to generate a bias voltage having a voltage value indicated by the bias voltage information Bs1, that is, a voltage value for a high slew rate of each amplifier. For example, the control signal generation unit SG generates the bias voltage control signal PWRC having a signal level LVa and indicating that all the three transistors Q3 to Q5 are set to an ON state, and supplies the bias voltage control signal PWRC to the sub-bias circuit SB1.

The voltage adjustment unit VCN of the sub-bias circuit SB1 adjusts the voltage value of the reference bias voltage VQ by sending the combination current It (I3+3·Ic) to the node L3 in response to such a bias voltage control signal PWRC. Based on the reference bias voltage VQ to which the voltage value has been adjusted, the sub-bias circuit SB1 generates the bias voltages VBH1 to VBH3 and VBL1 to VBL3 having a voltage value corresponding to the voltage value indicated by the bias voltage information Bs1 and supplies the bias voltages VBH1 to VBH3 and VBL1 to VBL3 to the amplifiers AP1 to APr.

The control signal generation unit SG generates the following bias voltage control signal PWRC over a period from a time point Td when the high SR period Tst has elapsed to a time point of a rising edge of the next clock signal CLK. That is, the control signal generation unit SG generates the bias voltage control signal PWRC for causing the sub-bias circuit SB1 to generate a bias voltage having a voltage value indicated by the bias voltage information Bs2, that is, a voltage value for low power consumption of each amplifier.

For example, the control signal generation unit SG generates the bias voltage control signal PWRC having a signal level LVb and indicating that all the three transistors Q3 to Q5 are set to an OFF state, and supplies the bias voltage control signal PWRC to the sub-bias circuit SB1.

According to such a bias voltage control signal PWRC, the voltage adjustment unit VCN of the sub-bias circuit SB1 does not perform adjustment for changing the voltage value on the reference bias voltage VQ generated due to the current I3. Therefore, in this case, the sub-bias circuit SB1 generates the bias voltages VBH1 to VBH3 and VBL1 to VBL3 having a voltage value corresponding to the voltage value indicated by the bias voltage information Bs2 based on the reference bias voltage VQ generated only due to the current I3, and supplies the bias voltages VBH1 to VBH3 and VBL1 to VBL3 to the amplifiers AP1 to APr.

According to the above operation, the operation current flowing through the differential stage DFP and the current mirror stage CMR of each amplifier AP during the high SR period Tst from the rising time point Tu of the clock signal CLK is higher than the operation current flowing after a time point at which the high SR period Tst has elapsed, as illustrated in FIG. 6.

Accordingly, since the slew rate of the amplifier AP increases during a rising or falling section of the driving voltage in which a high speed response is required, a rising or falling time of the driving voltage output from the amplifier AP also becomes short.

On the other hand, an operation current flowing in the differential stage DFP and the current mirror stage CMR of the amplifier AP during a period from the time point Td when the high SR period Tst has elapsed to the time point of a rising edge of the next clock signal CLK is lower than the operation current flowing in the high SR period Tst, as illustrated in FIG. 6.

Accordingly, power consumed by the amplifier AP is decreased during a constant voltage value section of the driving voltage in which no high speed response is required.

Therefore, according to the output amplifier unit 133, it is possible to reliably drive the display device 20 with low power consumption and at high speed in a small-scale configuration, as compared with a device which detects the transition period of the driving voltage by providing the dummy amplifier in addition to the amplifiers AP1 to APn and operating the dummy amplifier.

Further, according to the configuration illustrated in FIG. 3, when the information (Bs1, Bs2) indicating the desired value of the bias voltage is stored in the bias setting register at voltage transition RG1 and the bias setting register at constant output RG2, the bias voltages (VBH1 to VBH3 and VBL1 to VBL3) having such a voltage value are generated in the sub-bias circuit SB.

Therefore, the adjustment of the bias voltage for the amplifiers AP1 to APn before product shipment can be easily performed, and it is also possible to cope with a power saving mode and a high speed (normal) mode by appropriately changing the voltage value of the bias voltage after the product shipment.

Further, although the period length of the high SR period Tst which is a period in which a high slew rate of each amplifier is realized is fixed in the above embodiment, the period length of the high SR period Tst may be appropriately changed.

Figure 7:
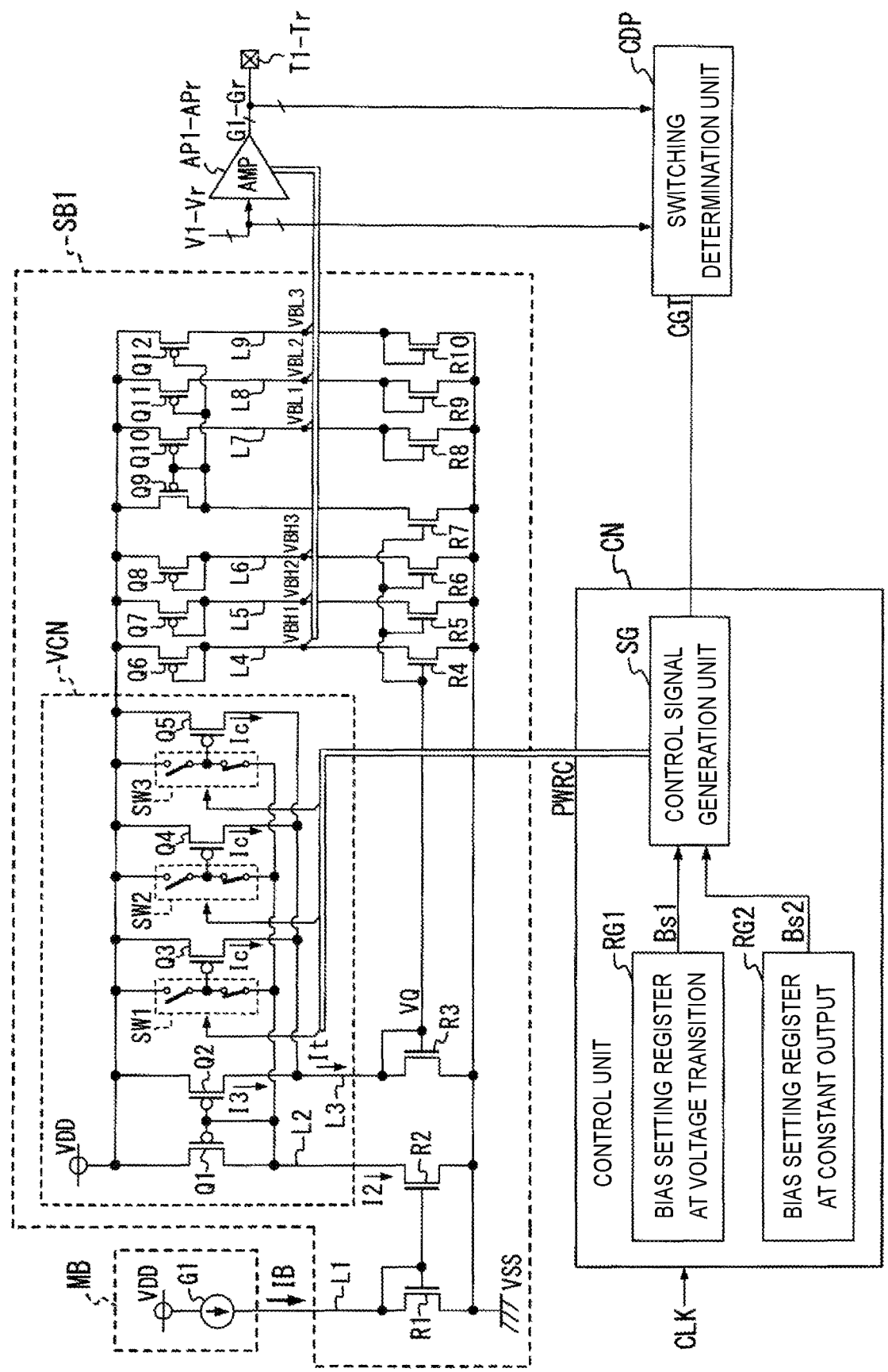
FIG. 7 is a diagram illustrating another example of the internal configurations of the control unit CN, the main bias circuit MB, and the sub-bias circuit SB1 in detail.

FIG. 7 is a diagram illustrating another example of the internal configuration of the control unit CN, the main bias circuit MB, and the sub-bias circuit SB1 which have been made in view of such a point. Further, in the configuration illustrated in FIG. 7, the switching timing register CRG included in the control unit CN is omitted, and a switching determination unit CDP is provided in place of the switching timing register CRG. Other configurations are the same as those illustrated in FIG. 3.

The switching determination unit CDP illustrated in FIG. 7 determines whether or not the voltage value of the driving voltage having a largest transition width among the driving voltages G1 to Gr output from the amplifiers AP1 to APr has exceeded a predetermined reference voltage value. Here, when the voltage value of the driving voltage having the largest transition width has exceeded the predetermined reference voltage value, the switching determination unit CDP supplies a switching command signal CGT to the control signal generation unit SG. According to the switching command signal CGT, the control signal generation unit SG switches the voltage value indicated by the bias voltage control signal PWRC from the voltage value indicated by the bias voltage information Bs1 to the voltage value indicated by the bias voltage information Bs2.

Therefore, a time point at which the voltage value of the driving voltage of which the transition width is largest has exceeded the reference voltage value is the time point Td at which the high SR period Tst has elapsed.

According to such a configuration, it is possible to make a length of the high SR period Ts shorter than that in a case in which the period length of the high SR period Tst is fixed, such that further reduction in power consumption can be achieved.

Further, although the switching determination unit CDP compares the voltage value of the driving voltage having the largest transition width with the predetermined reference voltage value in the above embodiment, the switching determination unit CDP may compare the voltage value of the driving voltage with the gradation voltage input to the amplifier AP that outputs this driving voltage. In this case, the switching determination unit CDP supplies the switching command signal CGT to the control signal generation unit SG at a time point at which the voltage value of the driving voltage becomes equal to the voltage value of the gradation voltage, that is, at which the rising or falling section of the driving voltage has ended.

Meanwhile, in the display device 20, n display cells on the horizontal scan line S to which the horizontal scan pulse has been applied among the horizontal scan lines S1 to Sm become driving targets according to the driving voltages G1 to Gn supplied from the data driver 13 via the data lines D1 to Dn.

Therefore, a rising or falling time of the driving voltage that is applied to the display cells arranged at positions far from the data driver 13 is longer than a rising or falling time of the driving voltage that is applied to the display cells arranged close to the data driver 13.

Therefore, the period length of the high SR period Tst which is used when the display cells located at the positions far from the amplifiers AP1 to APn are driving targets is set to be longer than the period length of the high SR period Tst which is used when the display cells arranged at the positions close to the amplifiers AP1 to APn are driving targets.

Figure 8:
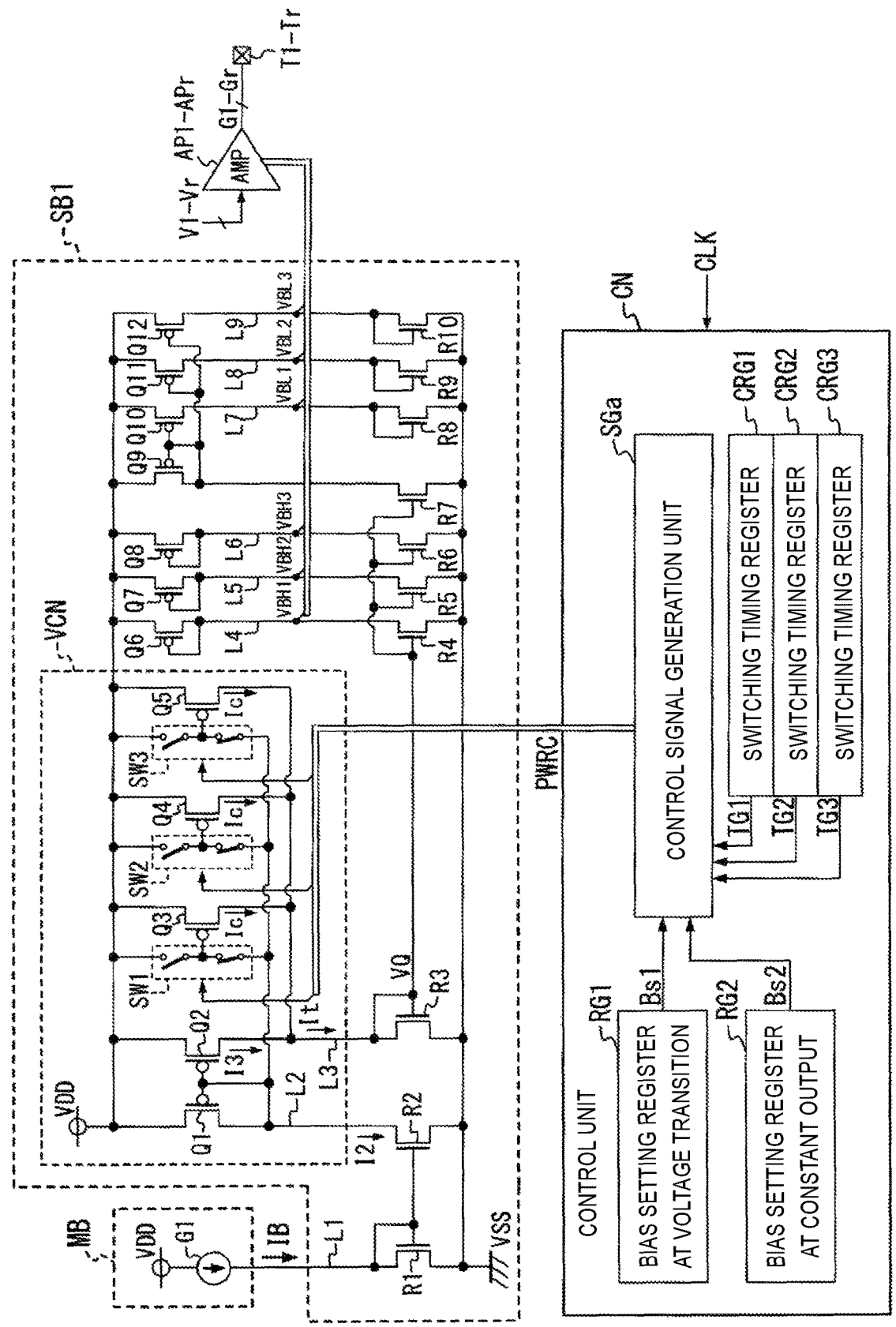
FIG. 8 is a diagram illustrating still another example of the internal configurations of the control unit CN, the main bias circuit MB, and the sub-bias circuit SB1 in detail.

FIG. 8 is a diagram illustrating another example of the internal configuration of the control unit CN, the main bias circuit MB, and the sub-bias circuit SB1 which are made in view of such a point. The configuration illustrated in FIG. 8 is the same as that illustrated in FIG. 3 except that switching timing registers CRG1 to CRG3 are adopted in place of the switching timing register CRG included in the control unit CN, and a control signal generation unit SGa is adopted in place of the control signal generation unit SG.

Therefore, operations of the switching timing registers CRG1 to CRG3 and the control signal generation unit SGa will be mainly described below.

Figure 9:
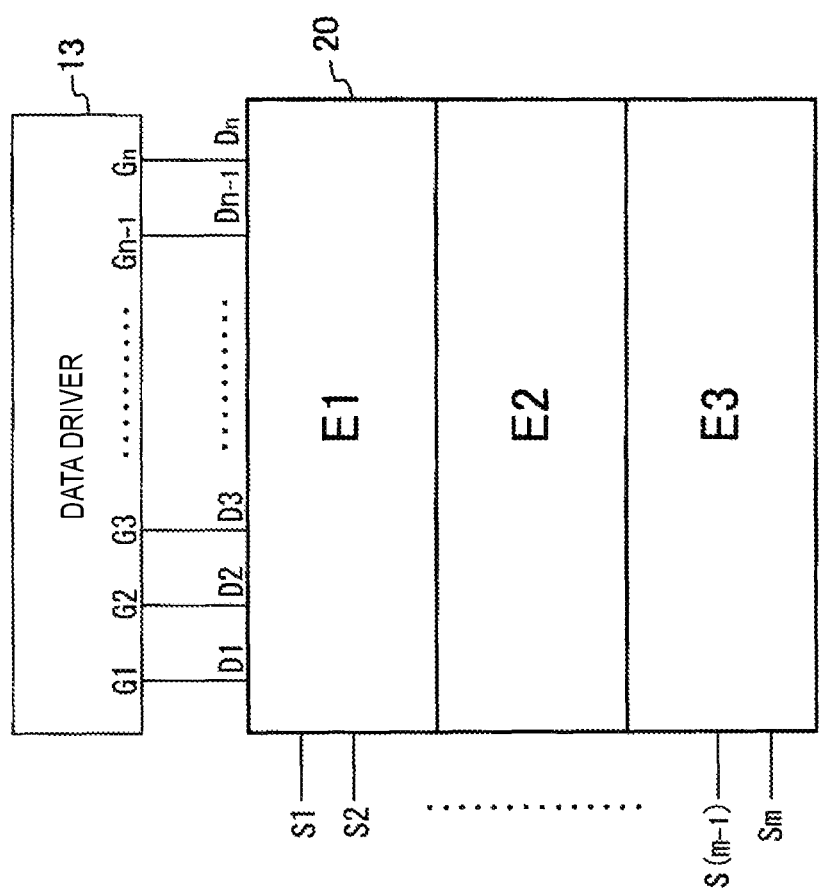
FIG. 9 is a diagram illustrating a form of regions E1 to E3 when horizontal scan lines S1 to Sm of a display device 20 are divided in three.

Switching timing information TG1 indicating a period length t1 of the high SR period Tst that is used at the time of driving each horizontal scan line S belonging to a region E1 when a display region of the display device 20 is divided into, for example, the regions E1 to E3 as illustrated in FIG. 9 is stored in the switching timing register CRG1. The switching timing register CRG1 supplies the switching timing information TG1 to the control signal generation unit SGa.

Switching timing information TG2 indicating a period length of the high SR period Tst that is used at the time of driving each horizontal scan line S belonging to the region E2 illustrated in FIG. 9, which is a period length t2 longer than the period length t1, is stored in the switching timing register CRG2. The switching timing register CRG2 supplies the switching timing information TG2 to the control signal generation unit SGa.

Switching timing information TG3 indicating a period length of the high SR period Tst that is used at the time of driving each horizontal scan line S belonging to the region E3 illustrated in FIG. 9, which is a period length t3 longer than the period length t2, is stored in the switching timing register CRG3. The switching timing register CRG3 supplies the switching timing information TG3 to the control signal generation unit SGa.

Figure 10:
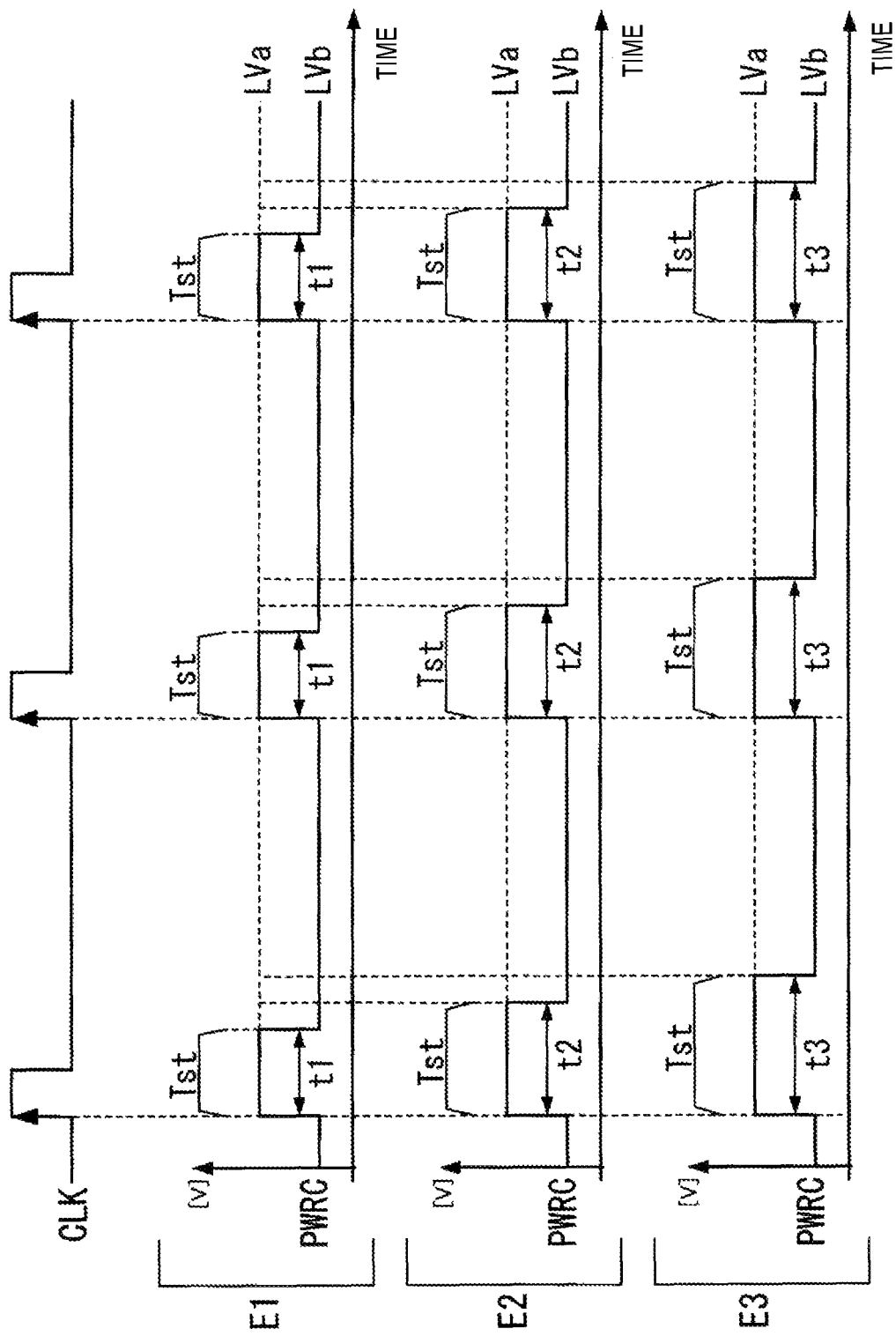
FIG. 10 is a diagram illustrating a high SR period Tst set for each of the regions E1 to E3.

The control signal generation unit SGa fetches the switch timing information TG1 from among the switch timing information TG1 to TG3 during a period when the scan driver 12 applies the horizontal scan pulse to each of the horizontal scan lines S belonging to the region E1 illustrated in FIG. 9. As illustrated in FIG. 10, the control signal generation unit SGa supplies the bias voltage control signal PWRC having the signal level LVa to the voltage adjustment unit VCN in order to achieve a high slew rate of each amplifier during the high SR period Tst having the period length t1 indicated by the switching timing information TG1.

Further, the control signal generation unit SGa fetches the switch timing information TG2 from among the switch timing information TG1 to TG3 during a period when the scan driver 12 applies the horizontal scan pulse to each of the horizontal scan lines S belonging to the region E2 illustrated in FIG. 9. As illustrated in FIG. 10, the control signal generation unit SGa supplies the bias voltage control signal PWRC having the signal level LVa to the voltage adjustment unit VCN in order to achieve a high slew rate of each amplifier during the high SR period Tst having the period length t2 indicated by the switching timing information TG2.

Further, the control signal generation unit SGa fetches the switch timing information TG3 from among the switch timing information TG1 to TG3 during a period when the scan driver 12 applies the horizontal scan pulse to each of the horizontal scan lines S belonging to the region E3 illustrated in FIG. 9. As illustrated in FIG. 10, the control signal generation unit SGa supplies the bias voltage control signal PWRC having the signal level LVa to the voltage adjustment unit VCN in order to achieve a high slew rate of each amplifier during the high SR period Tst having the period length t3 indicated by the switching timing information TG3.

That is, the length of the high SR period Tst is changed so that the length of the high SR period Tst to be used at the time of driving the horizontal scan line S disposed at a position far from the amplifiers AP1 to APn among the horizontal scan lines S1 to Sm becomes longer than the length of the high SR period Tst to be used at the time of driving the horizontal scan line S disposed at a position closer to the amplifiers AP1 to APn.

Accordingly, it is possible to uniformize the rising or falling time of the respective driving voltages G1 to Gn over the entire display region of the display device 20.

Further, in the above embodiment, each amplifier AP receives one gradation voltage V and amplifies the gradation voltage V to generate one driving voltage G. However, for each amplifier AP, a multi-input type amplifier that receives a plurality of gradation voltages V and generates an average voltage of the respective gradation voltages V as one driving voltage G may be adopted.

Figure 11:
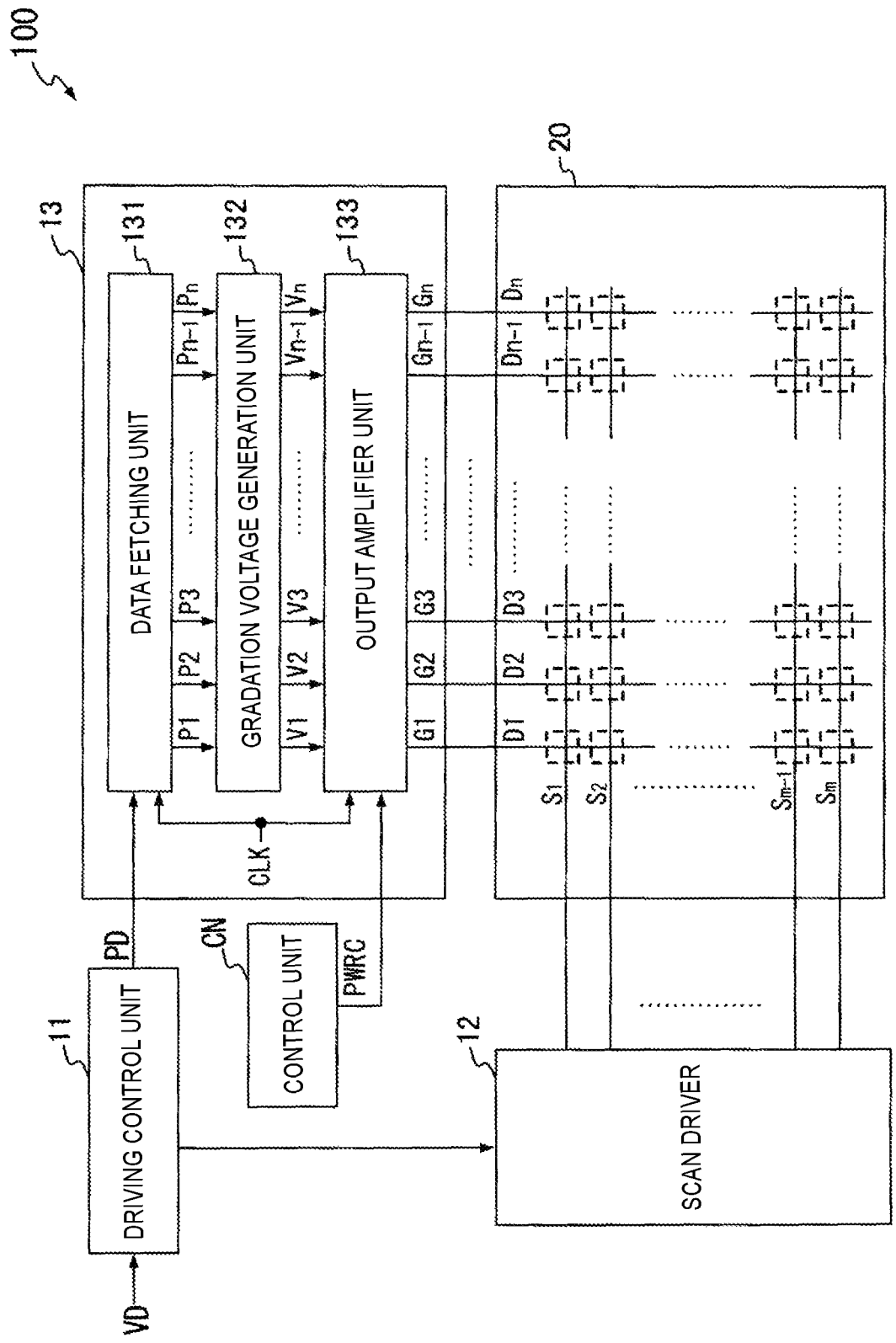
FIG. 11 is a block diagram illustrating a configuration of a display apparatus 100 when the control unit CN is provided outside a data driver 13.

Further, although the control unit CN is provided inside the data driver 13 included in the semiconductor IC chip in the above embodiment, the control unit CN may be provided outside the data driver 13, that is, outside the semiconductor IC chip including the data driver 13, as illustrated in FIG. 11.

In short, the display driver (13) according to the disclosure may include the following data fetching unit, gradation voltage generation unit, first to Nth amplifiers, and bias voltage generation unit in driving the display device 20 including N (N is an integer equal to or greater than 2) data lines.

That is, the data fetching unit (131) receives first to Nth pixel data pieces (P1 to Pn) indicating luminance levels based on a video signal (VD) for each pixel, and outputs the first to Nth pixel data pieces at a timing of an edge of a clock signal (CLK). The gradation voltage generation unit (132) converts the first to Nth pixel data pieces output from the data fetching unit into first to Nth gradation voltages (V1 to Vn). The first to Nth amplifiers (AP1 to APn) supplies first to Nth driving voltages (G1 to Gn) obtained by amplifying the first to Nth gradation voltages to first to Nth data lines (D1 to Dn). The bias voltage generation unit (1330) generates bias voltages (VBH1 to VBH3 and VBL1 to VBL3) for setting current values of operation currents (Iu1, Ij1, Iu2, Ij2) of the first to Nth amplifiers to the first to Nth amplifiers.

Further, the bias voltage generation unit includes registers (RG1, RG2) that store first information (Bs1) indicating a first voltage value that is a voltage value of a bias voltage for setting the current value of the operation current to a first current value, and second information (Bs2) indicating a second voltage value that is a voltage value of a bias voltage for setting the current value of the operation current to a second current value smaller than the first current value.

Here, the bias voltage generation unit generates the bias voltage having the first voltage value expressed by the first information (Bs1) during a period from a time point of the edge of the clock signal (CLK) to a time point (Td) when a first period (Tst) has elapsed. The bias voltage generation unit switches the voltage value of the bias voltage to the second voltage value expressed by the second information (Bs2) at the time point (Td) when the first period (Tst) has elapsed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display driver that drives a display device comprising first to Nth data lines, wherein N is an integer equal to or more than 2, the display driver comprising:
    a semiconductor integrated circuit (IC) chip, configured to:
    receive first to Nth pixel data pieces indicating luminance levels based on a video signal for each pixel and outputs the first to Nth pixel data pieces at a timing of an edge of a clock signal; and
    convert the first to Nth pixel data pieces into first to Nth gradation voltages;
    wherein the semiconductor IC chip comprises:
    first to Nth amplifiers that supply first to Nth driving voltages obtained by amplifying the first to Nth gradation voltages to the first to Nth data lines; and
    a bias voltage generation circuit that generates bias voltages for setting current values of operation currents of the first to Nth amplifiers and supplies the bias voltages to the first to Nth amplifiers,
    wherein the bias voltage generation circuit comprises a register that stores first information indicating a first voltage value that is a voltage value of the bias voltage for setting a current value of the operation current to a first current value and second information indicating a second voltage value that is a voltage value of the bias voltage for setting the current value of the operation current to a second current value lower than the first current value, and the bias voltage generation circuit generates the bias voltage having the first voltage value indicated by the first information during a period from a time point of the edge of the clock signal to a time point at which a first period has elapsed, and switches the voltage value of the bias voltage to the second voltage value indicated by the second information at the time point at which the first period has elapsed.

2. The display driver according to claim 1,
wherein the first period has a period length corresponding to a time taken for a transition of a voltage value of the driving voltage output from the amplifier from a voltage value corresponding to a lowest luminance to a voltage value corresponding to a highest luminance in response to a transition from a voltage value indicating the lowest luminance to a voltage value indicating the highest luminance in the gradation voltage.

3. The display driver according to claim 1,
wherein information indicating the first period is stored in the register.

4. The display driver according to claim 1,
wherein the bias voltage generation circuit comprises:
a current source that generates a reference current;
a voltage adjustment circuit that generates a reference bias voltage based on the reference current, obtains the first voltage value by performing adjustment based on the first information on the reference bias voltage and obtains the second voltage value by performing adjustment based on the second information on the reference bias voltage.

5. The display driver according to claim 1,
wherein the amplifier comprises:
a differential stage that generates a first current and a second current obtained by dividing a first operation current in two at a voltage ratio between the gradation voltage to be input and an output voltage to be output,
a current mirror stage that supplies a second operation current corresponding to a difference between the first current and the second current to a driving node or extracts the second operation current from the driving node to generate an output driving voltage at the driving node,
an output stage that supplies an output current corresponding to the output driving voltage to an output node or extracts the output current from the output node to generate the output voltage at the output node, and
a bias adjustment unit that adjusts current values of the first operation current and the second operation current according to the bias voltage.

6. The display driver according to claim 1, comprising:
a scan driver that sequentially applies horizontal scan pulses to first to Mth horizontal scan lines arranged crossing the first to Nth data lines in the display device and sequentially drives the first to Mth horizontal scan lines, wherein M is an integer equal to or greater than 2,
wherein a length of the first period used by the bias voltage generation circuit at the time of driving the horizontal scan lines arranged at positions far from the first to Nth amplifiers in the first to Mth horizontal scan lines is longer than a length of the first period used by the bias voltage generation circuit at the time of driving the horizontal scan lines arranged at positions close to the first to Nth amplifiers.

7. The display driver according to claim 1, wherein the bias voltage generation circuit further comprises:
a switching determination circuit that sets a time point at which the voltage value of the driving voltage having a largest transition width of the voltage value among the first to Nth driving voltages exceeds a predetermined reference voltage value, as the time point at which the first period has elapsed.

8. The display driver according to claim 1, wherein the bias voltage generation circuit further comprises:
a switching determination circuit that sets a time point at which the voltage value of the driving voltage having a largest transition width of the voltage value among the first to Nth driving voltages and the voltage value of the gradation voltage corresponding to the driving voltage having the largest transition width become equal, as the time point at which the first period has elapsed.

9. A semiconductor device comprising a display driver that drives a display device comprising first to Nth data lines, wherein N is an integer equal to or more than 2, the semiconductor device comprising:
a semiconductor integrated circuit (IC) chip, configured to:
receive first to Nth pixel data pieces indicating luminance levels based on a video signal for each pixel and outputs the first to Nth pixel data pieces at a timing of an edge of a clock signal; and
convert the first to Nth pixel data pieces into first to Nth gradation voltages;
wherein the semiconductor IC chip comprises:
first to Nth amplifiers that supply first to Nth driving voltages obtained by amplifying the first to Nth gradation voltages to the first to Nth data lines; and
a bias voltage generation circuit that generates bias voltages for setting current values of operation currents of the first to Nth amplifiers and supplies the bias voltages to the first to Nth amplifiers,
wherein the bias voltage generation circuit comprises a register that stores first information indicating a first voltage value that is a voltage value of the bias voltage for setting a current value of the operation current to a first current value and second information indicating a second voltage value that is a voltage value of the bias voltage for setting the current value of the operation current to a second current value lower than the first current value, and
the bias voltage generation circuit generates the bias voltage having the first voltage value indicated by the first information during a period from a time point of the edge of the clock signal to a time point at which a first period has elapsed, and switches the voltage value of the bias voltage to the second voltage value indicated by the second information at the time point at which the first period has elapsed.

* * * * *